United States Patent Office 3,522,030
Patented July 28, 1970

3,522,030
FUNGISTATIC PREPARATIONS AND METHODS OF TREATING PERISHABLES
Joseph W. Eckert and Martin J. Kolbezen, Riverside, Calif., assignors to The Regents of the University of California
No Drawing. Continuation of application Ser. No. 409,596, Nov. 6, 1964, which is a continuation-in-part of application Ser. No. 218,111, Aug. 20, 1962. This application Jan. 6, 1967, Ser. No. 607,648
Int. Cl. A01n 3/02; A23b 7/00
U.S. Cl. 71—68      12 Claims

ABSTRACT OF THE DISCLOSURE

A composition of matter containing 2-aminobutane or one of its salts in solution are effective in controlling or inhibiting mold and fungi which could cause decay in perishables. 1-2-aminobutane or one of its salts in solution are particularly effective in controlling or inhibiting decay-causing organisms such as mold and fungi. A method for preventing decay in perishables by contacting the surface of perishables with the above-identified compositions.

---

This application is a continuation of our application Ser. No. 409,596, filed Nov. 6, 1964, now forfeited, which in turn is a continuation-in-part of our application Ser. No. 218,111, filed Aug. 20, 1962, now abandoned.

This invention relates to improvements in compositions of matter which have a fungistatic effect on various organisms, and in particular, to compositions of matter which control or inhibit organisms such as molds or fungi which cause decay of perishables such as various fruits vegetables, and flowers, and methods of employing them.

A constant demand exists for compounds and compositions of matter which are effective in controlling or inhibiting organisms such as molds or fungi which cause decay of fruit, vegetables, and flowers without adversely affecting their odor, appearance, color, or safety for consumption. Commercially available compounds and compositions of matter used to prevent such decay have one or more of these disadvantages. Further, the effectiveness of some prior compounds and compositions is limited to a narrow range of pH and temperature when applied to a particular fruit or vegetable, and their use involves meticulous control.

We have discovered that compositions of matter containing 2-aminobutane or one of its salts in solution are effective in controlling or inhibiting organisms such as molds or fungi which cause decay in fruits, vegetables, and flowers, without adverse side effects. Although citrus fruit such as oranges, lemons, or grapefruit present a large commercial field of utility (and the following examples generally illustrate this field), our new compositions of matter and methods of application are equally effective on organisms which decay various fruit such as melons, apples, pears, bananas, pineapples, strawberries, grapes, etc., as well as vegetable such as tomatoes, lettuce, and the like, and cut flowers such as gladioli, chrysanthemums, dahlias, stocks, etc.

Further, we have found that compositions of matter containing 2-aminobutane or one of its salts in solution are effective as fungistatic agents on such organisms over a relatively wide range of temperatures and pH without injury to the particular perishable material involved. In addition, we have found that 2-aminobutane or one of its salts may be added to various cleansing and waxing formulations without disturbing its fungistatic properties.

We have found also that the effectiveness of 2-aminobutane and its salts as fungistatic agents is due for the most part to the presence therein of the levo isomer of 2-aminobutane, and that compositions containing l-2-aminobutane or one of its salts in solution are particularly effective in controlling or inhibiting the decay-causing organisms.

It is, therefore, an object of this invention to provide new and useful compositions of matter which control or inhibit various organisms which cause decay of perishables such as fruits, vegetables, and flowers.

Another object of this invention is to provide such compositions of matter which do not adversely affect color, odor, appearance, or fitness for consumption of the particular perishable in question.

A further object of this invention is to disclose a method of treating perishables to inhibit decay thereof by contacting such perishables with a treating agent containing a sec-butylammonium cation.

A further object of this invention is to provide fungistatic compositions of matter containing l-2-aminobutane or one of its salts in solution and to disclose a method of treating perishables therewith.

A still further object of this invention is to provide compositions of matter which possess fungistatic, cleansing and waxing properties and can be readily used with existing packing-house equipment in employing the method of this invention.

These and other objects will be more readily understood by reference to the following discussion and claims.

2-aminobutane is a normal straight chain saturated hydrocarbon having an amino group replacing one of the hydrogens attached to the second carbon atom from one end of the molecule. This compound is a moderately volatile organic base, having a boiling point of 63° C. and a vapor pressure at 20° C. of 135 mm. of mercury. It is miscible with water and organic solvents such as ethanol, benzene, hexane and acetone. It forms water soluble amine salts with inorganic and organic acids (aliphatic, aromatic and polybasic organic acids): sec-butylammonium chloride, di-(sec-butylammonium) sulfate, tri-(sec-butylammonium) citrate, di-(sec-butylammonium) phosphate, sec-butylammonium acetate, sec-butylammonium carbonate and sec-butylammonium propionate are examples.

These and other amine salts of 2-aminobutane are equally effective as 2-aminobutane itself in exerting a fungistatic effect on organisms causing decay of fruit without producing adverse side effects, when applied to the fruit in the form of a solution or dispersion. In solution, the amine base of 2-aminobutane is converted to the amine cation, the proportion of cation released increasing with reduction of pH. Also, when an acid such as hydrochloric acid is added to a solution of 2-aminobutane, sec-butylammonium cation is formed having a positive charge with chloride as the anion. The unusual effectiveness of the compositions of this invention appears to be due to the presence of this cation.

Since the sec-butylammonium cation is not appreciably volatile, solutions containing it are relatively stable and effective not only in neutral solutions but in acidic as well as in basic solutions (ranging in pH up to about 10.5) even at temperatures from about 35° F. up to 120° F., the latter being the maximum practical temperature tolerated by fresh citrus fruits.

2-aminobutane possesses one asymmetric carbon atom. The compound exists, therefore, as two optical isomers, l-2-aminobutane and d-2-aminobutane. These two forms of 2-aminobutane possess virtually identical chemical and physical properties except that the d-form rotates polarized light to the right, whereas the l-form rotates it to the left. From a structural consideration the two forms are mirror images. Commercial synthetic 2-aminobutane is a mixture consisting of 50 percent of each form. The racemate may be resolved by crystallization of the d- and l-forms as salts of a d- and l-acid, such as d- and l-tartaric acids.

Experimental work clearly showed that the l-isomer of commercially available 2-aminobutane is more effective in reducing decay of fruit and exerts a greater fungistatic action than the d-isomer or the usual mixture. The expense of isolating the more active l-isomer may discourage its use in large volume treatments, but its greater activity may be valuable for specialized situations and uses as a fungistat. Reference herein to 2-aminobutane and its salts, or to a composition containing a sec-butylammonium cation, includes the normal racemic mixtures as well as the isomers.

In general, 2-ainobutane or one of its salts and preferably l-2-aminobutane or one of its salts, can be directly applied to the particular fruit or vegetable or flower to be treated, either as a solution, or suspension or dispersion or as a foam. Such treatment will control or inhibit organisms which cause decay, as well as concurrently exert a cleansing effect when detergents are present. Similarly, 2-aminobutane or one of its salts may be formulated with waxes, resins, or coloring matter used to enhance appearance, or to improve gloss or to retard shrinkage of the fruit or vegetables in question. Various methods of application may be used, such as washing, dipping, spraying or rubbing. Such application and control are trouble-free since temperatures and pH need not be maintained within a narrow range as is the case with other fungistatic or fungicidal agents such as sodium orthophenylphenate. In the treatment of citrus fruit, the pH of compositions of matter containing 2-aminobutane or one of its salts is preferably maintained between 8 and 10.5 which is readily accomplished. Contact of the treating agent with the perishable should be maintained for a suitable time to permit absorption or fixation of the cation in the exposed cells or structure in which decay originates, and immediate or excessive rinsing is not advisable. Treating time on the order of those generally employed in packing houses (about 0.5 min. to 3 or 4 min.) are satisfactory.

Apples and pears are usually washed and treated at relatively low temperatures (generally between about 33° F. and 65° F.). The following table indicates the effectiveness of our treating agent when used on apples (Red Delicious).

| Treatment | Percent decay after 20 days in storage | |
| --- | --- | --- |
| | Rinsed | Not Rinsed |
| Water only | 100 | |
| 0.5% 2-aminobutane, pH 8.5, 1 min. at 50° F | 31.3 | 15.7 |
| 0.5% sodium orthophenylphenate, pH 11.5, 1 min. at 50° F | 75.5 | (¹) |

¹ Treatment must be rinsed because of hazard of fruit injury.

Treatment of citrus fruit is generally carried out at temperatures of between 70° F. and 120° F., and the increased activity of our agent at higher temperatures is well utilized within this higher working range, as shown by the following series with Valencia oranges:

| Treatment | Temperature °F. | Percent decay after storage for 14 days |
| --- | --- | --- |
| Water only | 110 | 99.0 |
| Do | 120 | 90.0 |
| 2-aminobutane, pH 8.5, 4 minutes rinsed | 70 | 15.5 |
| Do | 90 | 16.7 |
| Do | 110 | 4.4 |
| Do | 120 | 4.4 |

However, as previously stated, excessive rinsing of the fruit is not desirable; the cation should be retained on the fruit for best results. For example, Valencia oranges were treated for 4 minutes at 73° F. with a pH 6.5 wash containing 0.5% 2-aminobutane (in the form of a chloride salt), and at the end of 7 days' storage 100% of control (water only) had decayed whereas decay was 12.2% (rinsed) and only 1.1% when not rinsed.

It may be noted that oranges treated with a 10% 2-aminobutane solution at 120° F. and pH of 9 showed no evidence of burning or injury even if the fruit were not rinsed.

The fungistatic effect of the solutions and compositions herein disclosed appears to cover a wide spectrum. For example, almost complete inhibition was obtained by the use of 0.1% 2-aminobutane (as the amine phosphate in a liquid nutrient medium at pH 7) on the following fungi:

Order Aspergillales:

*Aspergillus niger*
*Penicillium digitatum*
*Penicillium italicum*
*Penicillium expansum*

Order Sphaeriales:

*Glomerella cingulata*
*Diaporthe citri*
*Endoconidiophora paradoxa*

Order Pseudosphaeriales:

*Pleospora lycopersici*
*Botryosphaeria ribis*

Order Pezizales:

*Sclerotinia sclerotiorum*
*Sclerotinia fructicola*

Fungi Imperfecti:

*Thielaviopsis paradoxa*
*Alternaria citri*
*Stemphylium sarcinaeforme*
*Cladosporium cucumerimum*
*Botrytis cinerea*

These and other fungi, including *Rhizopus nigricans*, attack a great variety of fruits, vegetables and flowers, among them being various citrus fruits (oranges, lemons, limes, etc.) pears, apples, plums, cherries, peaches, melons, grapes, tomatoes, peppers, carrots, cucumbers, lettuce, avocados, strawberries, bananas, pineapples, etc. *Penicillium digitatum*, for example, causes Green Mold of citrus fruits. *Diaporthe citri* causes Stem End Rot of citrus fruits. *Sclerotinia fructicola* causes Brown Rot of stone fruits (peaches, plums, cherries, etc.); treatment with compositions of this invention including direct contact with dispersed or dissolved, ionized forms of 2-aminobutane and its salts, prolongs the effective life of the fruits and vegetables. It is to be remembered that some species of molds and fungi may be more resistant than others, so that concentrations higher than 0.1%, a pH other than 7, and a holding time adequate to produce suitable absorption may have to be used in order to obtain inhibition. The presence of a wetting agent or surfactant in the treating solution is often desirable but not essential.

When the l-isomer is used as a fungistat (or as a mild antiseptic solution containing a compatible surface active agent), the concentration may be reduced to as low as 0.005%.

The following experiments demonstrate the fungistatic activity of the isomeric forms of 2-aminobutane.

A racemic mixture of dl-2-aminobutane was resolved by repeated crystallization of (d)-sec-butylammonium hydrogen (d)-tartrate and (l)-sec-butylammonium hydrogen (l)-tartrate. The procedure used was similar to that described by P. Bruck, I. N. Denton and A. H. Lamberton in J. Chem. Soc. 1956, page 921. The pure d- and l-isomers of 2-aminobutane which were resolved gave specific rotation values of +7.96° and −8.09°, respectively.

The isomers were then dissolved in water containing an equivalent quantity of HCl and the resulting amine hydrochloride solution adjusted to pH 6. These stock solutions were diluted further with water to give the desired concentrations for the following experiments:

Spores of Penicillium digitatum were suspended in 1% (v./v.) clarified orange juice in water containing indicated amounts of 2-aminobutane (as sec-butylammonium hydrochloride) and the cultures incubated at 25° C. for 25 hours. The percent germination of the spores is given below:

| | Micromoles 2-aminobutane per ml. nutrient medium | | | | | | |
|---|---|---|---|---|---|---|---|
| | 0 | 0.01 | 0.03 | 0.10 | 1.0 | 3.0 | 10.0 |
| | Percent germination | | | | | | |
| Form of 2-aminobutane: | | | | | | | |
| None | 92 | | | | | | |
| l-aminobutane | | 91 | 47 | 1 | | | |
| d-2-aminobutane | | | | | 72 | 51 | 38 |
| dl-2-aminobutane | | 90 | 85 | 17 | | | |

This experiment illustrates that most of the fungistatic activity of dl-2-aminobutane is due to the l-2-aminobutane which it contains. The l-isomer was approximately 100 times more fungistatic than the d-isomer in inhibiting germination of the spores in the medium.

Other experiments conducted in the same manner as the preceding (except that the nutrient medium consisted of a mixture of 1% (v./v.) clarified orange juice of water, 0.25% sucrose, and 0.025% yeast extract) show that spores (and mycelial growth) of Phomopsis citri, Monilinia fructicola and Penicillium digitatum, are inhibited more by the l-isomer than by the d-isomer of 2-aminobutane, and that the fungistatic activity of the racemate is due largely to the l-2-aminobutane present in the mixture.

In still further experiments, Valencia oranges were inoculated by making punctures 2 mm. deep in the rind on 2 sides of each fruit with an inoculating tool that had been dipped in a suspension of spores (500,000/ml.) of Penicillium digitatum. After inoculation the fruit were incubated for 24 hours at 25° C. before the treatments were applied. The stock solutions of the amine isomers were appropriately diluted and made to contain 0.1% (w./v.) of Triton X–100 (an alkylphenoxy polyethoxy ethanol sold by Rohm and Haas Co.). One drop (ca. 30 mg.) of the appropriate treatment solution was placed on each inoculation site and the water evaporated in a cool air draft. The fruit were subsequently stored for ten days at 20° C. for decay to develop. The results are set forth below:

Treatment:                  Number of decay lesions [1]
    Control (50 micromoles NaCl/ml.) _____ 63
    10 micromoles l-isomer/ml. _____ 4
    10 micromoles d-isomer/ml. _____ 54
    50 micromoles d-isomer/ml. _____ 20
    10 micromoles dl (racemate)/ml. _____ 10

[1] Maximum possible—80; 40 oranges per treatment, each orange inoculated at 2 sites. Numbers denote average of three experiments.

Compositions of matter containing the amine cation of 2-aminobutane may be prepared in two general ways; one, by merely adding 2-aminobutane to a solution containing a stoichiometric equivalent quantity of a neutralizer acid and adjust the pH to the desired value, and two, by preparing the solid amine salt of 2-aminobutane and dissolving or dispersing it in the desired solution or vehicle.

We have found that 2-aminobutane, as well as its salts, derived from acids stronger than 2-aminobutane are effective in water solution as fungistatic agents in controlling organisms causing decay in citrus fruits over a range of concentration from as low as 0.1% by weight to 10% by weight, in solutions having a pH ranging up to about 10.5, and solution temperatures ranging from 75° F. to 120° F. Solutions ranging in pH from about 5.5 to about 10.5 are preferred, with those ranging in pH from about 8 to about 10.5 being most preferred. With practical and economical considerations in mind, we have found that water solutions containing about 0.5% by weight of 2-aminobutane (or one of its salts) are adequate for all purposes in preventing decay of citrus fruits. It may be noted that when reference is made to the use of 0.1% to 10% of 2-aminobutane such reference also contemplates a weight or proportion of a salt of this amine derived from an equivalent weight of the amine; for instance, a solution containing 20% of the sulfate salt of 2-aminobutane would come within the scope of this invention.

Since citrus fruits are generally washed in a packing house, it is highly desirable that fungistatic agents for controlling decay of citrus fruits be compatible in solution with various compositions of matter having a cleansing effect on fruit. We have found that solutions of 2-aminobutane (and its salts) are compatible with conventional soaps at a pH above about 8 without measurable adverse effect on fungistatic properties. Further, we have found that solutions of 2-aminobutane (and its salts) are compatible over the entire pH range with nonionic detergents of types such as polyoxyethylene sorbitol esters (sold under the trademark "Tweens," by Atlas Powder Co.), polyalkylene glycol ether (sold under the trademark "Tergitol" XD, by Union Carbide & Chemical Co.), alkylphenoxy polyethoxy ethanols (sold under the trademark "Tritons," by Rohm & Haas Co.) and polyoxyethylene ethanols, again without measurable adverse effect on fungistatic properties.

In addition, solutions of 2-aminobutane as well as its salts are compatible with pH buffers and so-called detergent "builders," such as sodium tetraborate, tetrasodium pyrophosphate, trisodium polyphosphate, disodium phosphate, and sodium hexameta phosphate. None of these pH buffers or detergent "builders" had a measurable adverse effect on the fungistatic properties of solutions of 2-aminobutane or its salts, so long as temperatures were not critical in any of the foregoing applications. A sample formulation of a composition of matter containing the amine hydrochloride of 2-aminobutane which is completely compatible with such pH buffers and detergent "builders" is as follows:

Parts by weight
2-aminobutane (converted to chloride) _____ 0.5
Tetrasodium pyrophosphate _____ 1.0
Prosol S–64–10 a blend of alkyl poly(ethyleneoxy) ethanol, alkyl poly(oxyalkalene) ethanols, and alkyl aryl poly(ethyleneoxy) ethanols (nonionic wetting agent from Process Chemical Co., Santa Fe Springs, Calif.) _____ 0.25
Water _____ 98.25

The solution is preferably adjusted to a pH of 9.0 to 9.5 by the addition of hydrochloric acid.

Another important property possessed by 2-aminobutane as well as its salts is their compatibility in formulations of emulsions and dispersions containing resins and waxes, which have great utility, since such formulations may be foamed, flooded or sprayed on the fruit, leaving a waxy gloss imparting and/or weight-loss retarding residue containing fungistatic agents on the surface of the fruit thereby prolonging the action and effect of the fungistatic agent. Water emulsion waxes compatible with 2-aminobutane as well as its salts are of two types; one is nonionic emulsifying agent formulation and the other is a formulation containing amine emulsifiers derived from fatty acids such as tall oil, oleic acid, and the like. The nonionic types of water emulsion waxes have advantages of being capable of use over a wide pH range and of being stable to high salt concentrations. An example of a formulation of the nonionic type of water emulsion wax containing the acetate salt of 2-aminobutane is as follows:

| | Parts by weight |
|---|---|
| Paraffin | 1.00 |
| Span 40 (Atlas Powder Co.) | 0.10 |
| Tween 40 (Atlas Powder Co.) | 0.11 |
| Sec-butylammonium acetate | 3.64 |
| Water | 95.15 |

Other amine salts of 2-aminobutane which may be substituted in the above formulation with equally good results on a gram equivalent basis include chloride, sulfate, phosphate (monohydrogen phosphate), propionate, succinate, citrate, adipate, and sorbate.

Wax formulations of the second type with an amine fatty acid emulsifier (ionic) have excellent spreading properties and are most effective at pH values of about 8.5 to 10.5. A suitable formulation of this type of wax emulsion incorporating 2-aminobutane (or its salts) is as follows:

| | Parts by weight |
|---|---|
| Paraffin | 0.89 |
| Carnauba | 0.11 |
| Cottonseed oil | 0.16 |
| Oleic acid | 0.39 |
| Triethanolamine | 0.24 |
| White oil | 1.85 |
| 2-aminobutane | 2.00 |
| Tall oil (93% fatty acids) | 2.50 |
| Water to make 100: titrate with 6 N acetic acid or equal to pH 10.5. | |

Other neutralizing acids may be substituted for the tall oil and acetic acid in the above formulation.

2-aminobutane may also be used in formulations of organic solvent type waxes which are sprayed or atomized on fruit and the solvent allowed to evaporate. Salts of 2-aminobutane are not soluble as such in petroleum solvents used in this type of formulation. However, coupling solvents such as absolute ethanol or isopropyl alcohol may be used to incorporate salts of 2-aminobutane into such solvent wax formulations. A number of salts of 2-aminobutane may be incorporated in this way and include acetate, propionate, sorbate, decanoate, oleate and palmitate. An example of this formulation is as follows:

| | Parts by weight |
|---|---|
| Petroleum naphtha B.P. 180–230° F. (Shell Rubber Solvent F) | 71.36 |
| Isopropyl alcohol | 5.00 |
| Glacial acetic acid | 1.64 |
| 2-aminobutane | 2.00 |
| Flavorseal concentrate V–500 a mixture of 50% by weight of cumarone-indene resins and 50% petroleum hydrocarbons (Food Machinery & Chem. Corp., contains 50% coating resins) | 20.00 |

Various methods of application to fruit or vegetables may be used for each of the preceding formulations containing 2-aminobutane or one of its salts in solution. Suitable methods of application may be found in the following U.S. Pats.: 2,070,936; 1,943,468; 2,503,663; 2,469,914; 2,150,283; 2,019,758.

The amine salts may be formed in situ or added; at all events, the sec-butylammonuim cation should contact the surface of the perishable for an effective period of time. This time may vary from say 2 seconds to a prolonged time (as where the treating agent is incorporated in a waxy composition). Flooding of oranges for 2 seconds with a treating solution reduced decay to 0.1% (14 days) where the fruit was not rinsed but resulted in 73% decay when the fruit was rinsed. Flooding for 1 to 4 minutes reduced decay to 13–15% even when rinsed.

While we have described this invention with respect to certain specific embodiments and applications, it is understood that various modifications may be made thereof without departing from the spirit and scope of the invention as claimed hereinafter.

We claim:

1. In a method for controlling molds and fungi which cause decay of perishables selected from the group consisting of fruits, flowers and vegetables, the step of directly contacting the surface of such perishables with a decay inhibiting effective amount of a composition of matter containing a solution of a member selected from the group consisting of 2-aminobutane and salts thereof.

2. In a method as stated in claim 1, wherein the composition of matter comprises a liquid composition having a pH of between about 5.5 and 10.5.

3. In a method as stated in claim 2, wherein the composition of matter comprises a solution containing a sec-butylammonium cation.

4. In a method as stated in claim 2, wherein the perishables are fresh fruit.

5. In a method as stated in claim 2, wherein the perishables are flowers.

6. In a method as stated in claim 2, wherein the perishables are citrus fruit.

7. In a method as stated in claim 1, wherein the salt is selected from the group consisting of the chloride salt, the sulphate salt, the citrate salt, the phosphate salt, the carbonate salt, and the propionate salt.

8. A composition which inhibits decay of perishables selected from the group consisting of fruits, flowers and vegetables by molds and fungi without adversely affecting the appearance and fitness for consumption of the perishable, said composition containing, in solution, a decay inhibiting effective amount of a member selected from the group consisting of l-2-aminobutane and salts thereof.

9. A composition which inhibits decay of perishables selected from the group consisting of fruits, flowers and vegetables by molds and fungi without adversely affecting the appearance and fitness for consumption of the perishables, said composition having a pH of between 5.5 and 10.5 and containing, in solution, from about 0.1% to 10% by weight of a member selected from the group consisting of 2-aminobutane and salts thereof.

10. A composition of matter according to claim 9, wherein the composition is a solution of a sec-butylammonium cation, said sec-butylammonium cation being present in an amount of from about 0.1% to 10% by weight.

11. A composition of matter according to claim 9 wherein said solution contains a surface tension reducing agent.

12. A method of inhibiting mold and fungi on vegetables comprising applying to the surface of said vegetables a composition of matter containing an effective amount of a solution of a member selected from the group consisting of 2-aminobutane and salts thereof.

References Cited

Frear: "A Catalogue of Insecticides and Fungicides," vol. I (1947), p. 148.

HYMAN LORD, Primary Examiner

U.S. Cl. X.R.

99—150, 154